United States Patent
Zeps et al.

(10) Patent No.: US 6,937,154 B2
(45) Date of Patent: Aug. 30, 2005

(54) METHOD AND APPARATUS FOR FACILITATING PERSONAL ATTENTION VIA WIRELESS LINKS

(75) Inventors: Rob Zeps, San Diego, CA (US); John Moores, Jr., Rancho Santa Fe, CA (US); Pertti Visuri, Fallbrook, CA (US); Rebecca Kramer, San Diego, CA (US); Mark James, San Diego, CA (US); Martin Franklin, San Diego, CA (US); Kurt Kremer, Cardiff, CA (US); Nashina Asaria, San Diego, CA (US)

(73) Assignee: Tabula Rasa, Inc.

( * ) Notice: Subject to any disclaimer, the term of this patent is extended or adjusted under 35 U.S.C. 154(b) by 0 days.

(21) Appl. No.: 09/938,356

(22) Filed: Aug. 21, 2001

(65) Prior Publication Data

US 2003/0043040 A1 Mar. 6, 2003

(51) Int. Cl.[7] .............................................. G08B 23/00
(52) U.S. Cl. ................................ 340/573.1; 340/572.4; 340/539.1; 340/691.1; 340/691.6; 340/692
(58) Field of Search .......................... 340/573.1, 572.4, 340/539.1, 691.1, 691.6, 692

(56) References Cited

U.S. PATENT DOCUMENTS

| | | | | |
|---|---|---|---|---|
| 5,694,514 A | * | 12/1997 | Evans et al. ................. | 386/46 |
| 5,696,503 A | | 12/1997 | Nasburg | |
| 5,708,423 A | * | 1/1998 | Ghaffari et al. .............. | 340/5.8 |
| 5,914,671 A | | 6/1999 | Tuttle | |
| 5,977,913 A | | 11/1999 | Christ | |
| 6,157,935 A | * | 12/2000 | Tran et al. ................... | 707/503 |
| 6,246,778 B1 | * | 6/2001 | Moore ......................... | 382/103 |
| 6,327,570 B1 | * | 12/2001 | Stevens ........................ | 705/7 |
| 6,385,772 B1 | * | 5/2002 | Courtney ..................... | 725/105 |
| 6,396,537 B1 | * | 5/2002 | Squilla et al. ............... | 348/239 |

* cited by examiner

*Primary Examiner*—Daniel J. Wu
*Assistant Examiner*—Tai T. Nguyen
(74) *Attorney, Agent, or Firm*—Irell & Manella LLP

(57) ABSTRACT

A method and system for identifying individuals, accessing and updating background information and directing appropriate personal interactions through use of an automatically readable tag, such as an RFID tag. Information encoded on the tag is communicated to a computer system that has a database, wherein identification information encoded on the tag is used as a key to retrieve the relevant background information and communicate that information to a portable display device. The system also takes a photograph of the individual being identified and automatically sends the photograph to the portable display device.

3 Claims, 4 Drawing Sheets

5.2 Logical Architecture

The logical architecture for the system consists of several events These include:

METHOD AND APPARATUS FOR FACILITATING PERSONAL ATTENTION VIA WIRELESS LINKS

The subject invention finds application in various areas, including, but not limited to, the identification of individuals, the accessing and updating of background information regarding individuals and directing of appropriate personal interaction with such individuals. Various environments exist where personal services and products are being rendered such as hospitality environments, retail environments, hospital environments, prison environments or marketing situations where appropriate interaction with customers is required. In such environments, it is important to identify a person entering the environment and to have immediate access to the relevant background information concerning that person.

Presently, systems and methods for identifying individuals, accessing and updating background information regarding such individuals, and directing appropriate personal interactions with them typically require some physical contact with the individual being identified as a prelude to being able to conduct any personal service for that individual. Representative of existing methods is the conventional "Name Tag" system where a printed name tag with text noting the individual's name and related information is printed on the face of the tag worn by the individual. This system requires visual contact with the name tag to receive the information about the individual before personal service can be delivered.

Such systems are time consuming and inconvenient to both the individual being identified and the person or persons delivering the personal service. In an emergency, a person may fail to respond to an individual's needs as a result of the time it takes to gather the relevant information about the individual. A more automated, efficient and reliable system of ensuring that individuals can be identified and that relevant information can be accessed so as to direct appropriate personal interaction is therefore needed.

SUMMARY

At the end of this application a number of claims are set forth, each of which, according to statute, is presumed valid independently of the validity of the other claims. Accordingly, the following discussion of various features, systems and methods is provided by way of introduction to the ensuing detailed description in order to assist in a more rapid comprehension thereof and is not intended to, and does not, limit the claims in any way.

According to one aspect of the disclosure, a system and method is provided for identifying individuals, accessing and updating background information concerning such individuals, and directing appropriate personal interactions with the individuals. The system employs an automatically readable tag, such as an RFID tag, containing identifying information regarding an individual. Information read from the tag is communicated to a computer system having a database, and the identification information is used as a key for retrieving relevant information regarding the individual. Such information is then communicated to a portable display device such as a pocket personal computer (PC).

According to one illustrative embodiment, an RFID tag contains a number comprising a unique identifier. Once an RFID scanner or reader reads the tag, it generates an RFID Tag Event in the computer system. When the RFID tag is read, the computer system signals a camera to capture an image of the individual carrying the tag. This image and the corresponding number read off the RFID tag are then sent by the computer system to a database, which is then updated with an event ID. This event ID can then be used to locate a file where the image created by the camera is stored. Once the image is stored, a message is sent to a portable display device notifying the user of the display device that a new image is present. The message on the portable display device provides the option of viewing information about the individual whose RFID tag was read. Specific information regarding the individual is stored in particular fields in the database, and may be transmitted to the user. The image of the individual just taken by the camera may also be transmitted to the portable display device.

Thus, a novel aspect of the invention is a method which employs the steps of detecting the presence of an individual by reading an encoded tag associated with that individual, and automatically responding to the detection of the individual by transmitting information regarding that individual to a display device. Further novelty resides in the step of displaying a selected portion of the information to a second individual on a display portion of the display device. Another novel aspect of the invention is automatically responding to detection of the individual by capturing an image of the individual and including that image in the information transmitted to the display device. Still another novel feature comprises transmission of status change information from the display device to computerized apparatus storing such status information.

BRIEF DESCRIPTION OF THE DRAWINGS

Illustrative embodiments implementing the invention will now be discussed in conjunction with the accompanying drawings of which.

DETAILED DESCRIPTION OF ILLUSTRATIVE EMBODIMENTS

Figure 1:
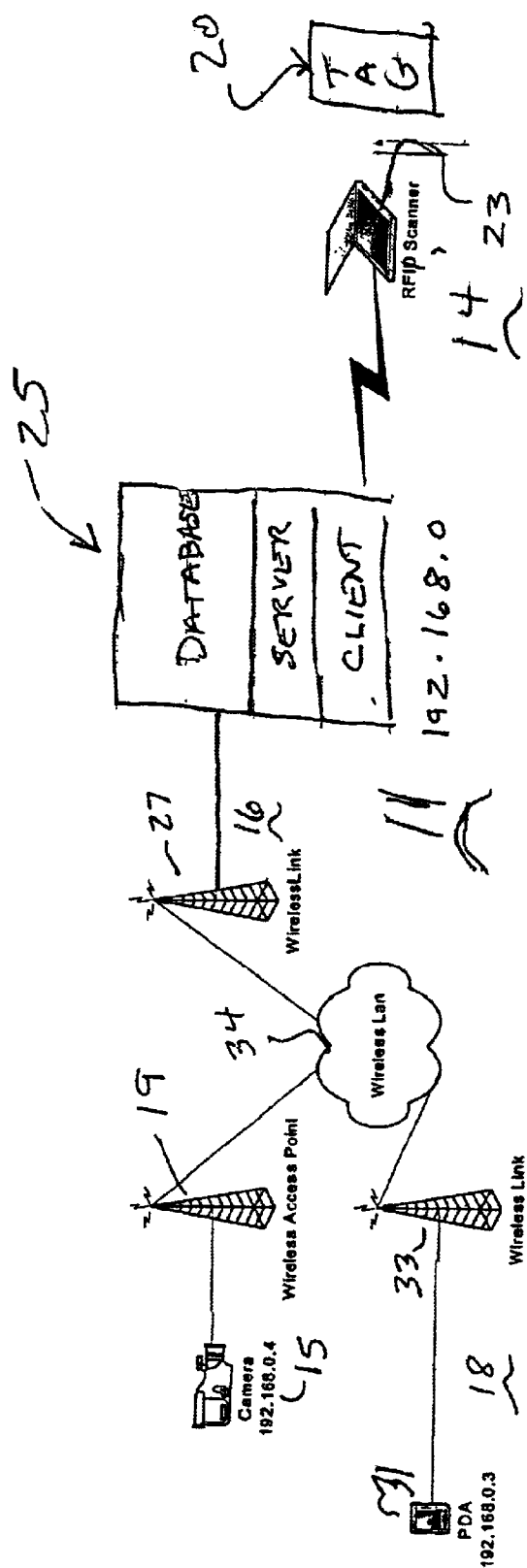
FIG. 1 is a schematic system diagram showing method for identifying individuals, accessing and updating background information and directing appropriate personal interactions.

FIG. 1 depicts an illustrative embodiment of a system 11 for facilitating personal attention, which reflects various aspects of the invention. At a first site 14 of the system 11, an image capture device 15 communicates with a wireless access point 19. The wireless access point 19 is a location for an antenna, receiver or other device for receiving a wireless transmission.

At a second site 16 of the system 11, a remote frequency identification (RFID) scanner 23 communicates with a computer 25, which in turn communicates with a wireless link 27. The scanner 23 is a machine arranged to read information regarding an individual, which information is encoded on an RFID tag 20 worn by that individual.

At a third site 18 of the system 11, a portable display device 31 communicates with a second wireless link 33. In the implementation under discussion, the wireless links 27, 33 and the wireless access point 19 form a wireless local area network (LAN) 34.

In an illustrative implementation of the system of FIG. 1, the 802.11b wireless technology is employed. As those skilled in the art will appreciate, 802.11b is a wireless Internet standard that operates in the 2.4 GHz band and can provide a nominal throughout of 11 Mbps (mega bits per second).

In the illustrative implementation, the RFID scanner 23 transmits events over a RS-232 serial communication link to a client application running on a high-end laptop computer 25 employing, for example, the Windows 2000 operating system. The computer 25 hosts a database 26 and is further equipped with an 802.11 PCMCIA card to implement the first wireless link 27.

In the implementation under discussion, the laptop 25 operates as a server and also hosts a client application, which interacts with the RFID scanner 23 via the RS-232 interface, as described hereafter in more detail. In other embodiments, the client application may run on a separate programmed digital computer arranged to communicate with the scanner 23. This second computer may then be arranged to handle communications over a wireless link between the client application and the server application. Since the data processing apparatus represented by the laptop 25 typically hosts the server, it will, at times, be referenced hereafter simply as the server 25. As those skilled in the art will appreciate, numerous forms of data processing apparatus using various operating systems can serve the purpose of computer 25. Additionally, in other embodiments, various communications links can be substituted for the RS-232 interface.

The portable display device 31 of the illustrative implementation may comprise an iPAQ Model No. 3670 personal digital assistant (PDA) as manufactured by COMPAQ Corporation. The iPAQ 31 is equipped with an expansion sleeve, as well as an 802.11 PCMCIA card to implement the second wireless link 33.

As those skilled in the art will appreciate, the iPAQ 31 includes a digital computer in the form of a microprocessor, as well as a display device controlled by the microprocessor. Any of a number of other PDA's may of course be employed. Additionally, in other embodiments, other portable devices may be used, such as laptop computers, digital pagers, and appropriately adapted cell phones.

The image capture device of the illustrative implementation 15 may comprise a Ricoh RDC-1700 equipped with an Ethernet LAN card. The device 15 may, of course, comprise other image capture devices, including such devices which capture an image in pixelated form employing CCD or CMOS device technology. The access point 19 may comprise an Aironet 340 access point as available from Cisco Systems, San Jose, Calif.

As illustrated in FIG. 1, the camera 15, PDA 31, and server 25 each have a unique address and, in particular, an IP address selected to facilitate wireless web-based or internet communications. As will be discussed in more detail, the illustrative implementation employs XML and HTML over the HTTP protocol. As indicated, the 802.11 protocol is used for wireless communications between the client, the server, and the iPAQ 31.

The RFID tag 20 includes an identifier comprising information which uniquely identifies a particular individual and distinguishes a particular individual from each other individual in the situation. In the illustrative application under discussion, the identifier simply comprises a number which is uniquely associated with that individual.

Overall operation of the illustrative implementation of the system of FIG. 1 will now be discussed in connection with FIG. 2. According to step 51 of FIG. 2, the scanner 23 reads the RFID tag 20 and generates an RFID Tag Event. No more than one such event may be triggered within a selected time period in order to avoid false triggers which might be generated as a result of the scanner 23 continuing to read the same tag 20. This mechanism to avoid false triggers is preferably incorporated into the RFID reader 23.

In response to generation of a RFID Tag Event, the client application causes transmission of a signal via the wireless link 27 to the camera 15. As indicated in step 53, this signal causes the camera 15 to capture an image of the individual who is wearing the RFID tag 20. The operation of camera 15 is initiated remotely over the wireless link by the client application via an HTTP request to capture and upload the appropriate image.

Figure 2:
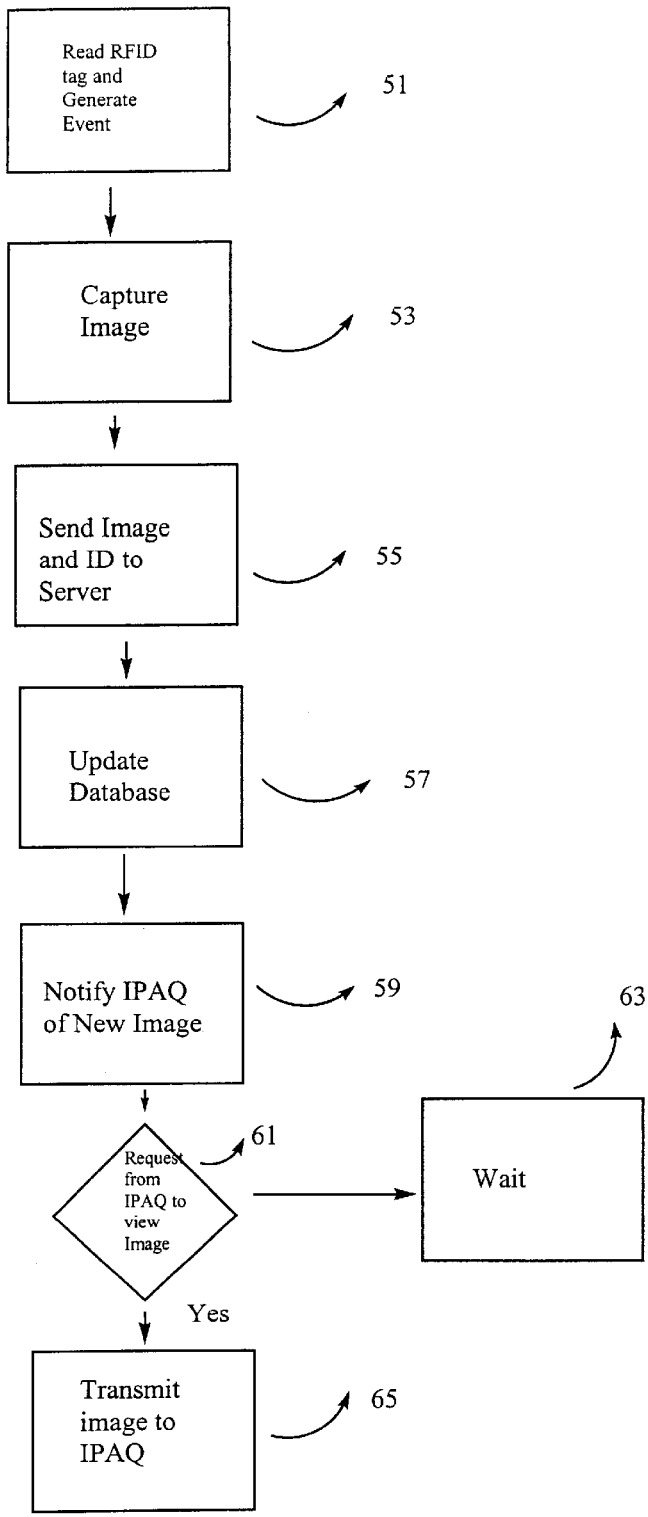
FIG. 2 is a flowchart illustrating operation of the system of FIG. 1.

As indicated in step 55 of FIG. 2, the captured image and the corresponding identification number which has been read off the RFID tag 20 are then sent by the client application to the server application. The database 26 is then updated with the event id. This event id can then be used to locate the file where the image is stored.

As indicated in step 59 of FIG. 2, once the image is stored on the server database 26, a message is sent via the wireless network 34 to the mobile iPAQ device 31. The message notifies the individual using the iPAQ 31 that a new image is present. This notification preferably occurs within 5 seconds from the time the RFID tag 20 is read by the scanner 23. If the RFID tag 20 is not read, no image is sent.

As noted, each RFID tag 20 carries a unique identifying number, and each captured image is associated with the corresponding RFID number read off the tag 20. The RFID number is an index to a record stored in the database 26 for the particular individual whose picture was taken.

The client application is preferably designed to deal with cases where an RFID number is not in the database 26. In such case, the fact that such a number has been detected is recorded in a log. The client application also deletes the entry in the database field of the file name when it is determined that a captured image is not associated a valid RFID tag number.

After the user of the iPAQ 31 is notified that a new image has been captured, the user is provided the option at decision diamond 61 of viewing information about the individual whose RFID tag 20 was read. Specific information for provision to the user is stored in the fields of the database 26. Thus, in Step 65, the image just captured at the second site 16 is automatically made available for viewing on the handheld iPAQ 31 located at the third site 18.

Additional capabilities may be provided in a system like that of FIG. 1. For example, the system may include the capability to collect statistics on RFID tags and images. Report specifications are defined for the number of tags read, invalid id number entries in the database, number of images recorded, etc.

Another capability which may be provided is the ability to administer the database records in order to add/update database information. Accordingly, import and export capabilities can be provided to interact with the database 26. An editor may also be provided to make minor changes to a given record. Mass import and export capabilities can be implemented using either Microsoft Excel or Access.

The system may further include the ability to transmit a customer's status to the IPAQ 31 for display to the iPAQ user. The iPAQ user may thus be alerted to the fact that a meeting between a host and a particular customer has occurred. The system may further include the ability to provide to the iPAQ 31 a list of people that have entered the room whose RFID tag 20 has been read.

It is desirable to employ a RFID reader which possesses the ability to read tags up to one meter away, although a shorter range may be used. In the implementation described above, there is no requirement to account for the speed at which the person is moving through the scanner 23, nor is the scanner 33 required to distinguish more than one RFID tag at a time. However, such a capability can be provided if desired. In particular, in a more complex system, multiple i.d. tags may be read and information related to a respective subset of the tags transmitted only to respective selected portable display devices.

As those skilled in the art will appreciate, there are a wide variety of presently available RFID scanner/tag systems. While an RFID scanner-RFID tag system is preferred, other systems employing other forms of machine readable encoded tags may be used, such as, for example, Bar Code or magnetic strip technology.

System Software Architecture

The following discussion addresses program design considerations for the implementation of System 11. Specific design issues addressed include event sequencing and choices for programming the iPAQ 31.

With respect to event sequencing, the overall design is an event flow model with events being generated by the RFID Reader 23, being processed by the client, and then the associated information being sent to a datastore which updates files/database records with the associated information. The mobile (iPAQ) client application uses a polling mechanism to determine if any events are available for it. The polling mechanism is implemented via a web service model wherein an HTTP request is repeatedly sent to a servlet which returns the time at which an event last occurred (the "last event time").

The iPAQ application uses this last event time to determine if a new even has occurred.

iPAQ Client

With respect to the iPAQ client application, two approaches have been identified. The basis for both approaches is to render the display in HTML using JSP (Java Server Pages) on the server to dynamically generate the necessary output. This method allows rapid changes to the appearance of the client application, without the need to recompile an application after editing.

The only variable in choosing the application approach is in deciding where to house the HTML control. This control can simply comprise the control as it exists within Internet Explorer or a separate control housed in a VB application.

In one implementation, a VisualBasic application has been employed which includes the use of an embedded HTML control for displaying the main portion of the application screen using HTML rendered on the server. An ActiveX control in C++ is used to access the event queue. The timer mechanism in VisualBasic checks the queue on a periodic basis (currently set to five seconds), and gives an indication to the user when new events show up in the queue.

Additional specifications for the processing of the Event Queue include the following:

1. When polling, the servlet returns the time as to when the last RFID camera event occurred.

2. If there is a new event, newer than the previous newest, then someone new has arrived and an alert is sent to alert the iPAQ user (audible alarm). Otherwise the list is just updated with any status changes which may have occurred.

3. A new page is created to view the entire list of persons who have arrived when a new entry is added or a status change is made.

Figure 3:
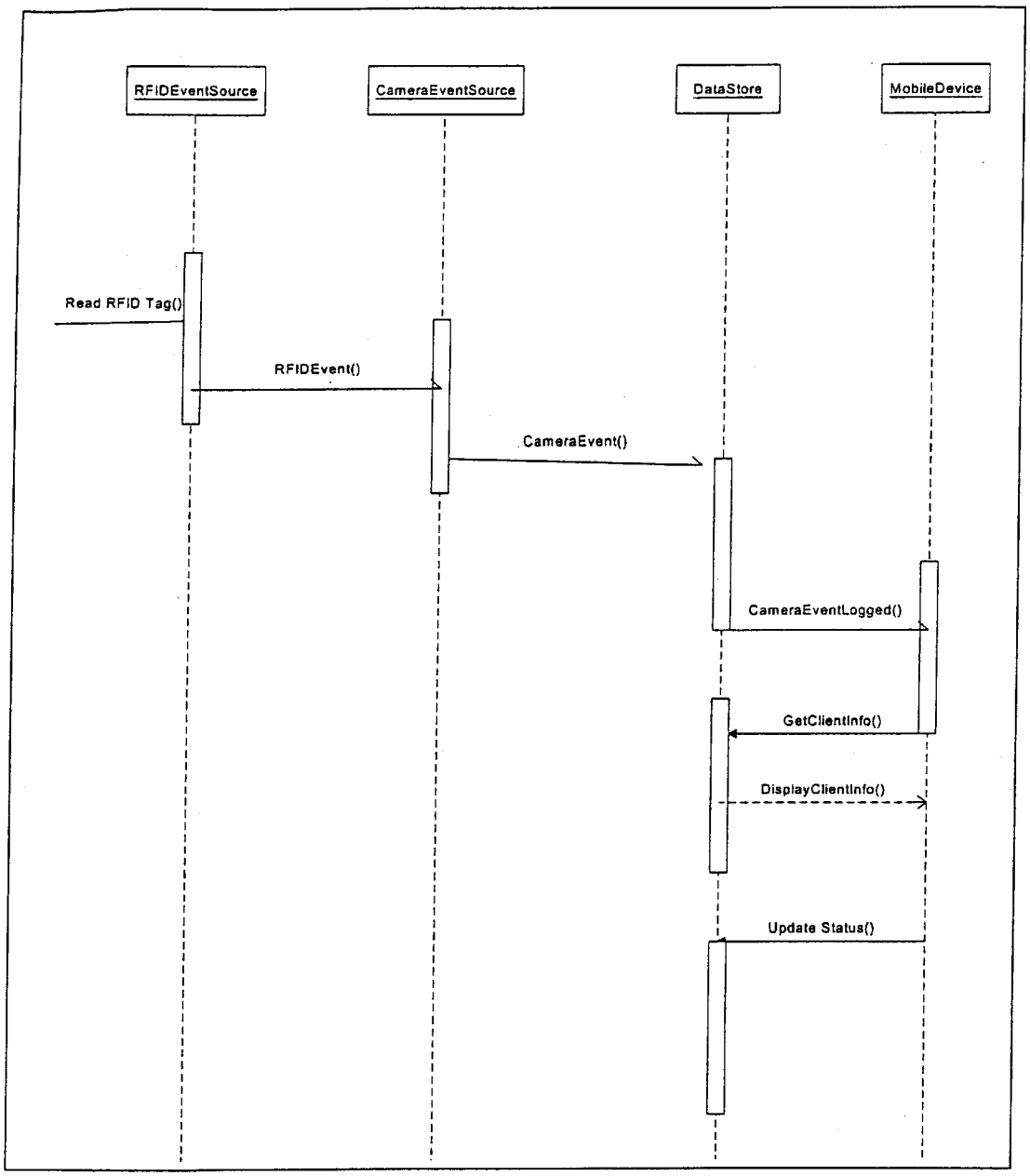
FIG. 3 is a UML (Universal Modeling Language) diagram reflecting the logical architecture of software employed in the system of FIG. 1.

FIG. 3 is a UML diagram reflecting the logical architecture of the software of the system under discussion. The diagram illustrates the various transaction states which exist: Read RFID Tag, RFIDEvent, CameraEvent, CameraEventLogged, GetClientInfo, DisplayClientInfo, Update Status. In the first state, the server 23 is waiting to detect a tag 20. Detection of a tag 20 triggers the second state wherein the camera 15 operates to capture an image. Upon capture of an image, the third state is entered wherein the image data is stored and the occurrence of a detection event is logged, causing entry into the fourth state wherein the mobile (portable) device (iPAQ) is notified that a particular individual has entered the room/been photographed. In the next state, the mobile device 31 requests the information from the database regarding the particular individual (client). The next two states reflect the response to the request wherein the information regarding the individual is provided to the mobile device and the transmission of a selected change in status from the mobile device back to the datastore.

The specific logical components that are needed by the client application running on the server computer 25 include the following:

RFID Tag Reader Component—Component used to capture RFID Tag Events. These events are sent to the Image Capture Component.

Image Capture Component—Used to capture an image and associate it with the RFID Tag Event. The Image Capture event is sent to the Update DBMS component.

Update DBMS Component—Used to log the information into the database for reporting and web display. This component generates a RFID Tag Event DB update which is sent to the Mobile Event.

DBMS Data Store—This component is used to capture the events and tag related information.

DBMS Lookup Component—This component performs database look-ups and formats the data for display on the appropriate display device.

The following server components are developed in Java:

RFIDEvent—The event generated by an RFIDEventSource.

RFIDEventSource—The RFID serial port reader source, creates an RFIDEvent and sends them to any/all RFIDEventListeners. It runs in its own thread of control listening to the serial port for events.

CameraEvent—The event generated by the action of taking an image via a camera.

CameraEventSource—The CameraEvent contains information about the image and is delivered to any/all CameraEventListeners. The CameraEventSource also runs in it's own thread of control. The implementor of the CameraEventSource must implement the RFIDEventListener interface to listen for RFIDEvents. These events are placed into a queue which is monitored by the CameraEventSource and act as the impetus for the picture being taken.

PollEvent—This servlet is accessed by an iPAQ client attempting to determine if any events have occurred which might interest it. Data is requested via an XML message and any information is returned in the same manner.

ReportingPage Java Server Pages (JSPs)—These are a set of data driven JSPs which can be accessed via a Pocket PC Internet Explorer.

The following iPAQ client component is written in C++:

MobileDeviceMonitor—This component monitors the MobileEventQueue by polling the associated servlet on a regular interval. When it determines that a new event occurs it signals the user with an audible alert warning. The device then allows the user to display information about the event in an HTML rendering. The HTML information is obtained via the ReportingPage JSPs. In addition, the user may indicate the disposition of the event from a simple selection list. Once disposed of, the event is removed from the server side DB event table, however, log information is retained by one of the ReportingPage JSPs.

Data Model

The following schema are implemented in the database 26:

User table—used to hold user details

| Field Name | Attributes |
| --- | --- |
| exdetails | varchar(100) |
| title | varchar(35) |
| company | varchar(50) |
| lastname | varchar(50) |
| firstname | varchar(50) |
| tagid | varchar(100) |
| personnalbio | varchar(1000) |
| companybio | varchar(1000) |

EventQueue—entry created when camera event occurs

| Field Name | Attributes |
| --- | --- |
| eventid | int |
| tagid | varchar(100) |
| time | long (time milliseconds as per java) |
| status | int (one of pre defined status values) |
| imagelink | varchar(50) |
| logicaldelete | boolean |

Status table—used to hold mapping of status to gif image.

| Field Name | Attributes |
| --- | --- |
| description | varchar(50) |
| imagelink | varchar(50) |
| status | int | iPAQ Screen Displays

Figure 4:
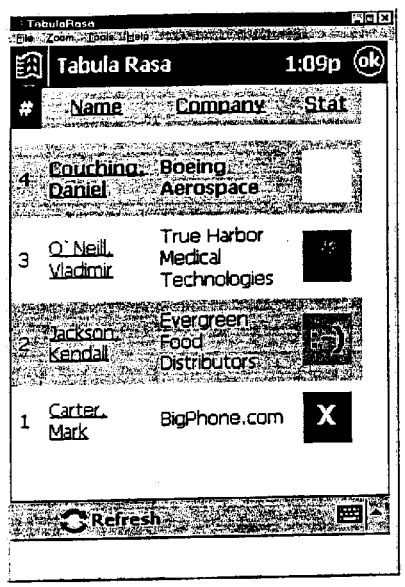
FIG. 4 is a screen display generatable in connection with operation of the system of FIG. 1.

Three screen displays designed for the iPAQ device 31 will now be described. Visual metaphors from Microsoft Outlook are used on the main List screen (FIG. 4) to indicate whether a person's profile has been viewed. Bold indicates an unread listing, plain text represents that the listing has been read. New entries to the system are displayed in Bold.

The displayed list of individuals, by default, is sorted by the chronological order in which guests have checked in. The list may be alphabetically sorted by Name or Company by clicking on the underlined column header.

Sorting by status can also be performed. The order of items when sorted by "Status" may be in the following sequence: "blank" items (these are in bold font) "Star" items, "Check Marked" items, and finally "NO-sign" items.

Figure 5:
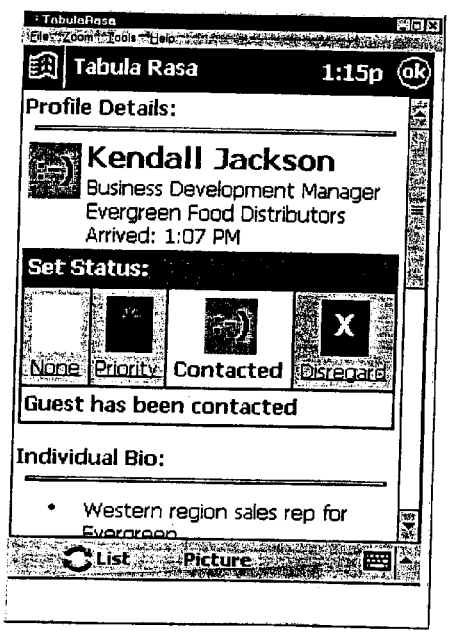
FIG. 5 is a screen display generatable in connection with operation of the system of FIG. 1.

The second screen illustrated in FIG. 5 provides additional information pulled from the database 26 about the specific guest selected. This screen also provides the user with the opportunity from this screen to set the status marker for the guest. Selecting "None" leaves the listing unmarked.

Red Star—Need priority attention.

Blue-green "happy face"—Guest has been contacted.

Black X—means this guest has been contacted already and others should disregard this lead.

By selecting one of the status icons by a "point and touch" or other operation, the screen is refreshed and the newly assigned Status icon is displayed by the Guest name. The respective status icon from the list is also shown in an "active" state. Following the process of marking the status of the guest, the user may return to the list screen or display a picture of the guest.

A third screen (not shown) is employed to display the image of a guest captured by the camera 15. This screen again includes a "List" button to return the user to the list screen. A "Details" button provides the user with expanded details about the guest they have selected.

One exemplary application for the apparatus described above is at conferences and hospitality suites. Preferred guests are given an RFID card 20 either prior to or during a conference or show. This card 20 is encoded with an identification number. The identification number has a reference id to a database entry that contains relevant business information regarding this individual, i.e. name, title, company, address, personal biographical data, etc. When the individual appears at the hospitality suite, the RFID reader 23 identifies the individual, a picture is taken and a notice then sent to specific hosts with PDA devices 31 who have been designated to locate and speak to the guest entering the room. The PDA device 31 has the capability to query the server containing the database 26 for other relevant information. The PDA device 31 also has the capability to update the database 26 as to the disposition of the notification after the person has been contacted.

Another feature which may be provided is the capability to develop a voice record file on the iPAQ 31, which may comprise notes of the conversation or personal follow-up message. The iPAQ 31 then transmits these messages for storage by the database 26. With respect to the voice record of a conversation, the record is merely stored. However, with respect to the personal message, the system can be made operative to transmit it via e-mail or pager to the individual.

Preferred wireless technologies which may be used in various embodiments employ the unlicensed Industrial, Scientific and Medical (ISM) bands, although other wireless communication frequencies can be used. The term "ISM bands, refers to frequency bands allocated by the FCC that were originally intended to allow electrical and mechanical equipment to radiate unintentional RF energy (at specific frequencies), without interfering with wireless communication applications operations in other frequency bands. Originally, wireless communication was not included in the ISM bands because of interference (the noise) in the environment. With the development of a technique known as spread spectrum it is possible to enable wireless communications in these ISM bands. The FCC decided that as long as its rules are obeyed no license is required to operate a wireless system in these ISM bands.

The spread spectrum technique allows RF circuitry to distinguish one digital RF signal from another when both are operating at the exact same frequency and in the same geographical location. There are two forms of spread spectrum. One is Direct Sequence Spread Spectrum (DSSS) and the other is Frequency Hopping Spread Spectrum (FHSS). DSSS refers to spread spectrum modulation of the signal where the transmitted signal is modulated with a special code and the receiver has the complementary code and is thus able to decipher the signal it receives. FHSS is similar to DSSS, except that the transmitted frequency is instantaneously and continuously changed according to a special code. Since the receiver has the same code, it knows what frequencies to look for when receiving and thus is able to decipher the signal. The act of modulating the signal with a special code "spreads" the bandwidth of the signal over a wider frequency range as it travels from the transmitters to the receiver. RF technologies, like Bluetooth, that use spread spectrum operate at frequencies above GHz.

Several short-range wireless technology options exist that occupy the frequency band of 2.4–2.4835 GHz of the radio spectrum, including Bluetooth, 802.11, and radio frequency identification (RFID).

The specific characteristics of each technology will be outlined in more detail.

Radio Frequency Identification (RFID)

The attractive quality of RFID tag technology is that the tag itself contains no internal power source (is passive) and derives power from the receiver or reader. Once the tag is powered, an electronic circuit becomes operative, which in turn sends a signal back to the reader. The trend for the growth of this technology is that the RFID tags are becoming tiny, cheap and easy to deploy. Recently, the advancement in printed circuitry in the RF arena has propelled this trend. Conductive inks can be used to form the antenna on a tag thus driving down the cost of the RF hardware and the power requirements.

802.11, 802.11a and 802.11b

This family of wireless technologies refers to the specification of Ethernet local area networks (LANs). Wireless products based on the 802.11 standard were originally developed for data only and would be used by corporations to facilitate mobile/wireless computing inside an office environment. Key characteristics of this technology include a larger range (up to 100 meters), faster data rates (1–2 Mbps for 802.11, 54–72 Mbps for 802.11a, and up to 11 Mbps for 802.11b) and greater consumption. 802.11, the original standard has been surpassed by other protocols because of faster data rates. 802.11 uses DSSS and is incompatible with Bluetooth while 802.11a employs OFDM (Orthogonal frequency-division multiplexing) and is still in development.

Bluetooth

This more recent short-range wireless technology was conceived to provide the interconnectivity of devices. Connections can be point-to-point or multipoint, with a relatively mid-range capability of ten meters. Currently, data rates approximate one megabit per second (Mbps), with this rate increasing to two Mbps in second-generation devices (available circa 2002). Bluetooth uses a frequency hop scheme (FSSS) that enables devices to communicate even in areas with substantial interference. Built-in encryption and verification is also provided. The advantages of Bluetooth include low power consumption, the ability to be device agnostic, and the ability to establish small local networks (piconets) that permit wireless information transfer. The main disadvantages are the relatively expensive cards, relatively short ranges, and interoperability with all other forms of wireless local area networks.

HomeRF

This industry standard was designed for wireless products for use in the home networking environments and competes with 802.11 and 802.11b. The relative advantages of this protocol are wider range, fast data rate, facilitation of both data and voice (compared to data-only 802.11), and less expensive to install than 802.11b. Operating within the 2.4 Ghz, HomeRF has a range of up to 150 feet at maximum throughput. Presently available HomeRF products offer 1.6 Mbps, however an FCC approval in August 2000 will spark the introduction of faster wireless products using the 10 Mbps speed by the first half of 2001. This ruling was important to the ability for HomeRF vendors, enabling them to compete with the 11 Mbps speeds of 802.11-based products. The main drawback of HomeRF is interoperability with 802.11b and Bluetooth.

HiperLAN2

This wireless technology bears remarkable resemblances to 802.11 and was developed by the ETSI (European Telecommunication Standardization Institute) to operate in the 5 GHz band. Though it is a European based standard, its operating band range makes it easily usable within the US and Asia where the 5 GHz band is also unlicensed. This protocol offers high-speed, wireless connectivity with up to 54 Mbps and seamless connectivity with corporate LAN, 3G cellular systems, mobility for future applications such as multimedia, voice over Internet protocol (VOIP) and real-time video. A significant difference between HiperLAN2 and 802.11a is how each standard addresses the QoS (Quality of Service) issue, 802.11a has wireless Ethernet capabilities that were extended to this band from other 802.11 specifications. HiperLAN2, supports time critical services and asynchronous data and is compatible with ATM, 3G, 1394, and IP networks. Finally, the protocol provides transmit power control and dynamic frequency selection, which should provide greater spectrum efficiency and lower interference probability with other systems operating on 5 GHz.

Custom RF Solutions

There are numerous options for customizing a wireless solution for a variety of needs. Customization usually dwells within the 900 MHz band because of the large number of consumer oriented components, devices and products traditionally employed there. Data rates are often lower that some of the more recognized standards, typically varying from 14 kbps–100 kbps. A customized solution permits specialized products and services that cannot utilize standardized RF solutions because of technical, environmental or economic considerations. Depending upon the complexity certain customized solutions can provide significant cost savings by incorporating simple, reliable and inexpensive technologies. Though not as robust as recent protocols such as Bluetooth and the 802.11 series, a customized solution permits functional wireless products to come to market as the other protocols gain momentum and significantly lower price points.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

What is claimed is:

1. A method of facilitating personal attention at an event site comprising:

providing each of a plurality of event hosts with a respective portable handheld display device;

assigning each host a respective guest to locate and contact at said event site;

providing a plurality of event guests with a radio frequency identification (RFID) card; each respective card being encoded with a different identification code, each code uniquely identifying one of said guests; each respective code further comprising a code for use in accessing a database entry containing information regarding the guest identified by that respective code;

detecting one of said codes in response to appearance of a first guest; and responding to detection of said one of said codes to wirelessly signal the handheld display device of the host assigned to said first guest that said first guest is present at said event, wherein said portable display device comprises a digital processor and a client application running on said processor, said client application employing a polling mechanism to determine if an event has occurred, said event comprising detection of one of said codes.

2. The method of claim 1 wherein said polling mechanism is implemented by repeatedly sending an HTTP request to a servelet.

3. The method of claim 2 wherein said servelet responds to said HTTP request by returning a time at which a last event occurred.

* * * * *